(12) United States Patent
Szubbocsev

(10) Patent No.: US 11,868,649 B2
(45) Date of Patent: Jan. 9, 2024

(54) MEMORY SYSTEMS FOR SECURE SEQUENTIAL STORAGE DEVICES

(71) Applicant: Micron Technology, Inc., Boise, ID (US)

(72) Inventor: Zoltan Szubbocsev, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 128 days.

(21) Appl. No.: 17/587,741

(22) Filed: Jan. 28, 2022

(65) Prior Publication Data

US 2023/0244411 A1 Aug. 3, 2023

(51) Int. Cl.
*G06F 3/00* (2006.01)
*G06F 3/06* (2006.01)
*G06F 1/3234* (2019.01)

(52) U.S. Cl.
CPC .......... *G06F 3/0655* (2013.01); *G06F 1/3275* (2013.01); *G06F 3/0604* (2013.01); *G06F 3/0629* (2013.01); *G06F 3/0676* (2013.01); *G06F 3/0679* (2013.01)

(58) Field of Classification Search
None
See application file for complete search history.

(56) References Cited

U.S. PATENT DOCUMENTS

2023/0068324 A1\* 3/2023 Drissi ................... G06F 3/0659

\* cited by examiner

*Primary Examiner* — Midys Rojas
(74) *Attorney, Agent, or Firm* — Holland & Hart LLP

(57) ABSTRACT

Methods, systems, and devices for memory systems for secure sequential storage devices are described. The system may identify a request for a first portion of a memory system to operate in a first configuration and a second portion of the memory system to operate in a second configuration. The system may enter, a first power mode having a lower power consumption than a second power mode based on receiving the request and store a first address associated with a last information to be stored in the first portion of the memory system before the first portion entered the first power mode. In some cases, the memory system may enter the second power mode based on storing the first address, read the first address, and store data in a second address consecutively indexed after the first address based on reading the first address.

25 Claims, 5 Drawing Sheets

MEMORY SYSTEMS FOR SECURE SEQUENTIAL STORAGE DEVICES

FIELD OF TECHNOLOGY

The following relates generally to one or more systems for memory and more specifically to memory systems for secure sequential storage devices.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
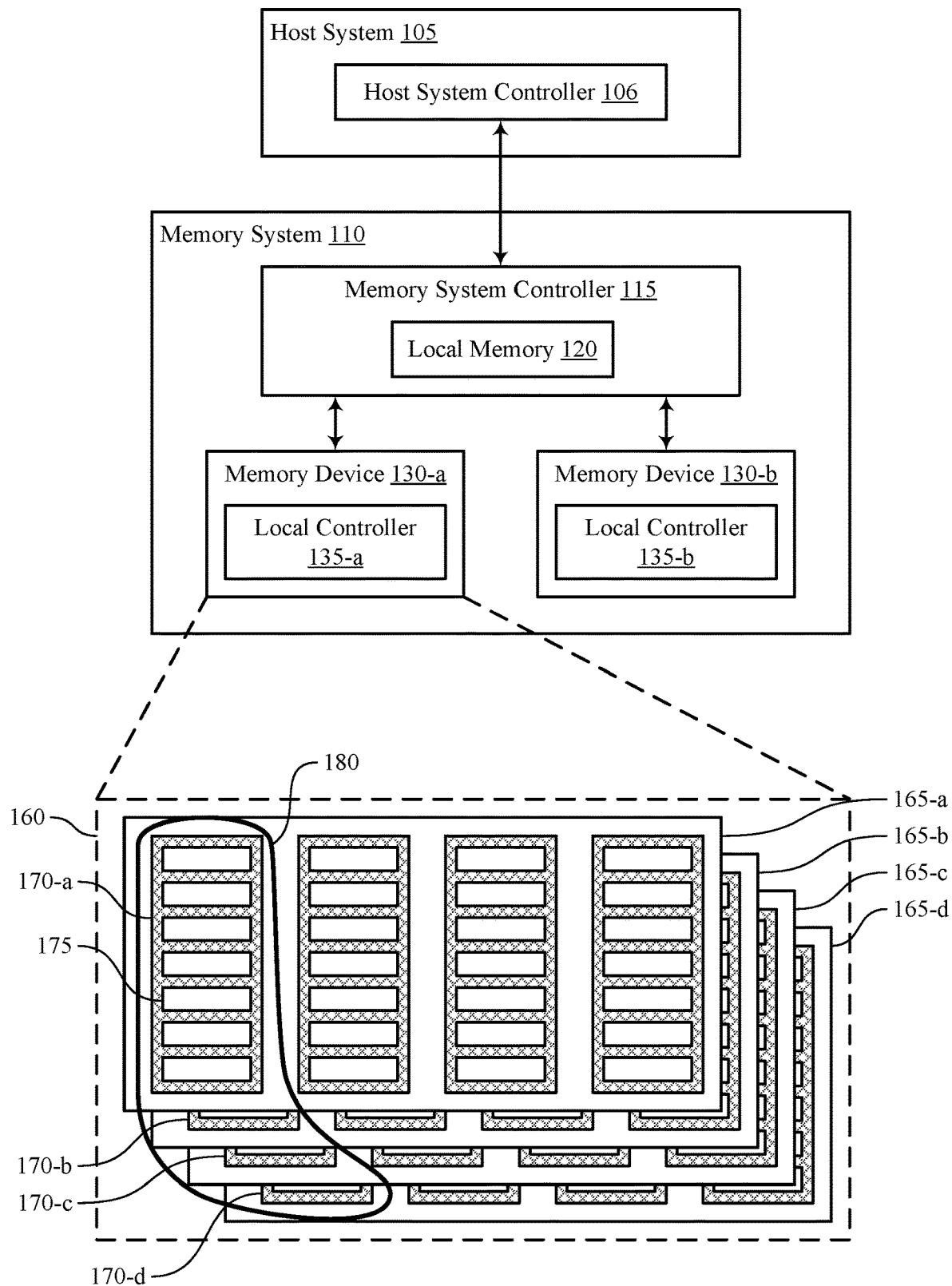
FIG. 1 illustrates an example of a system that supports memory systems for secure sequential storage devices in accordance with examples as disclosed herein.

Some memory systems may have multiple power modes that are used in a variety of different scenarios. For example, a memory system may have a power mode for performing access operations and a different power mode (such as a low power mode) to conserve power. In some cases, the memory system may experience a power loss event in which the memory system may enter the low power mode or a power off mode. Some memory systems may use a file system to handle power loss events.

In some cases, the memory system may include a portion of the memory system that operates using a black box configuration (e.g., a first configuration). The black box configuration may be an example of a portion of a memory device that writes information sequentially to the memory system in a secure manner (e.g., write protected). In purpose of a black box configuration may be to store important information in a continuous manner and in a way that make it difficult to modify the data at a later time. In some black box applications, the writing of data is continuous and may "wrap-around" and overwrite previous data after the memory system is full. In some examples, the black box configuration may not include a file system due to the simplicity of the continuous and sequential writing. Wrap around memory techniques may be implemented easily with some memory technologies, such as hard-disks or tape storage on a continuous loop. In other memory technologies, such as not-and (NAND) memory, the file system used to address logical cells and physical cells may increase the latency of sequential storing streams of information and also provide ways for the data to be modified at a later time. When implementing black box configurations in some memory technologies with file systems, techniques may be used to disable or reduce the impact of the file system when storing information in the black box configuration. Techniques are described for adjusting some functionality operating the memory system when operating in a black box configuration. Specifically, techniques are described handling a power loss event when operating in a black box configuration.

In the event of a power loss event, the memory system may use functionality associated with its file system to determine a last successfully written address such that the memory system may continue writing in the continuous and sequential manner when the memory system powers back on. However, if the file system of the memory system is removed or its functionality reduced for portions of the memory system that use a black box configuration and a power loss event occurs, the memory system may be unable to quickly and efficiently identify the last successfully written address such that the memory system may be unable to continue writing to the memory system after being powered up again. In such cases, the overall performance of the memory system may decrease, which may result in a host system experiencing impaired read, write, and erase speeds. Techniques for increasing efficiency and reducing the latency for the memory system may be desired.

Techniques, systems, and devices are described herein for increasing performance and reducing latency by storing the last successfully written address for a portion of a memory system operating according to a black box configuration in response to a power loss event. The last successfully written address may be an example of an address associated with the last information to be stored before the memory system experienced a power loss event. To handle power loss events without a file system, the memory system may include a register to record the last successfully written address when the power loss event occurs. The memory system may detect a power loss event and enter a first power mode (e.g., low power mode and/or power off mode) having a lower power consumption than a second power mode (e.g., active and/or power on mode). In such cases, the memory system may store, in the register, a first address associated with a last information to be stored in the memory system before the memory system entered the first power mode.

The memory system may enter the second power mode after storing the first address in the register. In some cases, the memory system may read, from the register, the first address in response to entering the second power mode and store data in a second address that is consecutively indexed after the first address. In such cases, the memory system may read the register and write in the next address (e.g., an address consecutively indexed with the last successfully written address). For example, the memory system may detect an asynchronous power down event, read from register, and continue writing the data to the memory system by reconstructing data in an order written.

In some cases, the memory system may be configured to include a first portion that operates in the black box configuration and a second portion that operates in a NAND configuration (or other non-volatile memory configuration). In such cases, the memory system may detect an asynchronous power down event, read from the register associated with the first portion, and continue writing the data to the first portion memory system while the second portion operates simultaneously according to different functionality or parameters (e.g., associated with a file system of the memory device).

By using the technique described herein, the memory system may reduce the latency of operations to store data to the memory system by storing the associated with a last information to be stored in the memory system before the power loss event occurred. Using this technique may improve the overall efficiency of the memory system, which may result in the memory system experiencing improved read, write, and erase speeds, reduced power consumption, improved processing times, reduced wear on memory cells, and the like.

Features of the disclosure are initially described in the context of a system with reference to FIG. 1. Features of the disclosure are described in the context of a system and process flow with reference to FIGS. 2-3. These and other features of the disclosure are further illustrated by and described in the context of an apparatus diagram and flowchart that relate to memory systems for secure sequential storage devices with reference to FIGS. 4-5.

FIG. 1 illustrates an example of a system 100 that supports memory systems for secure sequential storage devices in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support memory systems for secure sequential storage devices. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, the system 100 may include at least the memory device 130 and the host system 105. In some cases, the memory device 130 may identify a request for a first portion of a memory system (e.g., memory device 130) to operate in a first configuration and a second portion of the memory system to operate in a second configuration different from the first configuration. The first configuration may be an example of a black box configuration in which the system 100 uses one or more pointers to write and overwrite information, and the second configuration may be an example of using a mapping between logical addresses and physical addresses to manage information.

Some memory systems may use a different addressing scheme than an associated host system 105. For example, a host system 105 may identify data using logical addresses (e.g., LBAs, virtual addresses, system addresses, or other logical addresses) and the memory system 110 may store the data at physical addresses that are independent of the logical addresses used by the host system 105. A physical address may identify a physical location of a corresponding memory cell (e.g., or a page of memory cells) within a memory device 130. The physical location of data within the memory device 130 may change over time due to the memory device 130 accommodating the writing of additional data, maintenance operations performed by the memory device 130, or for other reasons. A host system 105 coupled with the memory system 110 may reference data (e.g., if issuing read, write, or other commands associated with the data) using the logical addresses, and the memory system 110 may generate and maintain a logical-to-physical (L2P) mapping between the logical addresses used in the communications with the host system 105 and the physical addresses of the memory cells at which the data is stored. Portions of such functionality may be part of a file system associated with the memory system 110.

In some cases, the memory device 130 may enter, by at least the first portion of the memory system (e.g., in the first configuration), a first power mode having a lower power consumption than a second power mode. Entering the first power mode may be in response to a power loss event experienced by the host system 105, the memory system 110, or both. In some cases, the memory device 130 may store a first address associated with a last information to be stored in the first portion of the memory system before the first portion entered the first power mode. For example, the first address may include a value that indicates the last successfully written LBA in the first portion when the first portion entered the first power mode. The last successfully written LBA may be an example of the last information to be stored in the first portion of the memory system before the first portion entered the first power mode.

The memory device 130 may enter, by at least the first portion of the memory system (e.g., in the first configuration), the second power mode having a higher power consumption than the first power mode based on storing the first address. The memory device 130 may read the first address in direct response to entering the second power mode. For example, the memory device 130 may read the first address to determine the last successfully written LBA. In such cases, the memory device 130 may store data in a second address consecutively indexed after the first address based on (e.g., in response to) reading the first address. For example, the memory device 130 may write the next LBA (e.g., second address) after the last successfully written LBA.

Figure 2:
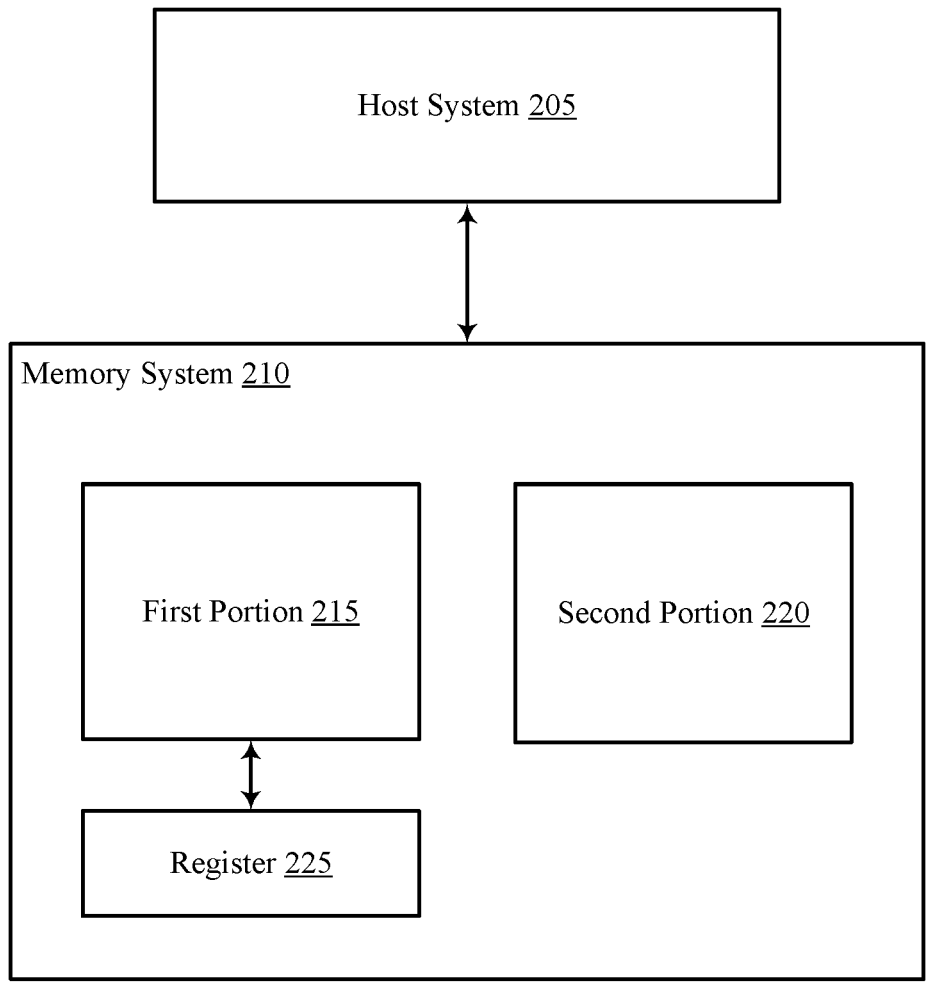
FIG. 2 illustrates an example of a system that supports memory systems for secure sequential storage devices in accordance with examples as disclosed herein.

FIG. 2 illustrates an example of a system 200 that supports memory systems for secure sequential storage devices in accordance with examples as disclosed herein. The system 200 may include a host system 205 and a memory system 210, which may be examples of the corresponding devices described with respect to FIG. 1.

The memory system 210 may include a first portion 215 and a second portion 220. The first portion 215 may use a first configuration where the first configuration may be an example of a black box configuration. For example, the first portion 215 of the memory system 210 may operate according to the first configuration that uses one or more pointers to write and overwrite information stored in the first portion 215. The first portion may be an example of one or more blocks, one or more pages, or one or more planes of the memory system 210.

The first configuration may be an example of a black box configuration. The black box configuration may be an example of a memory system that mimics functionality associated with 'black boxes' found in airplanes or other vehicles. In such a configuration the information may be written in a secure (e.g., a write protect mode) and continuous manner. For example, the black box application may write information including a video feed from a security camera or data from an airplane in flight. In such cases, the memory system 210 may configure a partition of the memory system 210 (e.g., first portion 215) to be used for black box applications including recording applications. In some cases, information stored in a black box application may not be readily accessible for retrieval but may be useful at a later time when the information may be analyzed more fully. Another aspect of a black box configuration is that the data is written in a manner that is more challenging to modify. Some memory systems, such as NAND systems, employ file systems which reduce the efficiency of black box applications by using features that enable fast retrieval of information (e.g., L2P mapping) and may slow down the write operations.

Write operations for the first portion 215 of the memory system 210 (e.g., the black box configuration) and write operations for the second portion 220 of the memory system 210 (e.g., NAND configuration) may operate differently. Write operations associated with the second portion 220 may include logical addresses. The host system 205 may generate information to be stored in the memory system 210 and may issue write commands that may manage metadata associated with file system (e.g., updates to L2P mapping and other mappings based on the logical addresses). Using logical addresses and updating mappings may consume processing resources, power, and time without benefits. In black box applications a continuous stream of information may be written in a sequential manner to the memory and easy retrieval or easy modification of the information may not be useful. Because the information is written in a sequential manner (e.g., it is not interrupted by other access operation) and retrieval is not as important, the usefulness of the L2P mapping and other mappings may be reduced. In some cases, using logical addresses and mappings for black box applications may decrease the endurance and performance of the memory system 210 by transferring mapping information to and from the NAND memory device that is less likely to be used in future access operation. In some cases (e.g., black box configurations), the file system may be reduced or removed from the portion of the memory system 210 that uses the particular configuration (e.g., the first portion 215). The memory system 210 may write data in a sequential and continuous (e.g., wrap around) manner when operating in the black box configuration. For example, the memory system 210 may write data from LBA 0 to LBA 100 where the LBAs range from LBA 0 to LBA 100. After writing to LBA 100, the memory system 210 may restart (e.g., wrap around) and write to LBA 0. In such cases, the memory system 210 may rewrite over LBA 0, thereby overwriting data when the memory system 210 runs out of storage. Thus, the first portion 215 may be an example of a circular buffer or circular portion of the memory system 210.

In some examples, the memory system 210 may experience a power loss event. In such cases, the memory system 210 may desire to continue writing from the last successfully written LBA in a sequential and continuous manner when the memory system 210 powers back on. However, the memory system 210 may be unable to quickly and efficiently retrieve the LBAs associated with the first portion 215 when the memory system 210 powers back on, thereby increasing the latency and overhead associated with the system 200 and decreasing the efficiency of the system 200. For example, the second portion 220 may use the L2P mapping or other mappings to identify the conditions of the second portion 220 that existed before the power down event. In other examples, because the first portion 215 may not use such mappings, it may be desirable for the memory system 210 to employ alternative techniques to recover from a power down event (whether planned or unplanned).

In such cases, techniques may be described for efficiently and effectively retrieve an address of the last successfully written LBA when the power loss event occurred. In such cases, the system 200 may configure a first portion 215 of a memory system 210 to use for black box applications and a second portion 220 of the memory system 210 for other applications. The second portion 220 may use a second configuration different than the first configuration. The second configuration may be an example of a NAND configuration. In such cases, the second portion 220 of the memory system 210 may operate according to the second configuration that uses a mapping between logical addresses and physical addresses to manage information stored in the second portion 220. The second portion 220 may be an example of one or more blocks, one or more pages, or one or more planes of the memory system 210.

In response to the memory system 210 experiencing a power loss event, the memory system 210 may recover and determine for the partition (e.g., first portion 215) the last successfully written LBA and store the value of the last successfully written LBA in a register 225. For example, the register 225 may be included in the first portion 215 of the memory system 210. In such cases, the register 225 may store a first address in the register 225 associated with the first portion 215 of the memory system 210. In some cases, the register 225 may be an example of a mode register.

The memory system 210 may track the LBAs written to and point to the next LBA to write based on determining the last successfully written LBA when the power loss event occurred. The power lost event may be scheduled or random. In some cases, the memory system 210 may be able to recover the last successfully written LBA such that when the memory system 210 powers on after a power loss event, the memory system 210 may include the address of the last successfully written LBA. The memory system 210 may read the register 225 to determine the address of the last successfully written LBA and continue writing from the last successfully written LBA. In some cases, the memory system 210 may use the address of the last successfully written LBA to recreate the order of the write pattern (e.g., restart writing to the first portion 215—in a circular buffer type configuration—at or near the location of the last write operation to the first portion).

The memory system 210 may determine the write sequence based on determining the last successfully written LBA. In some cases, the memory system 210 may read out the data backwards (e.g., determine the previously written LBAs) or forward (e.g., determine the next LBAs to be written to). For example, the memory system 210 may determine that a power loss event occurred and determine that LBA 50 was the last successfully written LBA based on reading the value from the register 225. In such cases, the memory system 210 may determine that LBA 51 is the next LBA to be written to and store data in LBA 51. In other examples, the memory system may determine that LBA 49 is the previous LBA to be written prior to LBA 50.

In some cases, a single memory system 210 may be configured to receive different types of commands (e.g., a black box write command and a normal write command) and write that information to different parts of the memory system 210. For example, the memory system 210 may receive a black box write command and write the information associated with the black box write command to the first portion 215. The memory system 210 may receive a different write command and write the information associated with the different write command to the second portion 220. The black box write command may include a sequential write command. In such cases, the memory system 210 and host system 205 that tracks the write sequence may refrain from tracking the write sequence because the data may be written sequentially and continuously, thereby decreasing the latency and overhead associated with operating the memory system 210. In such cases, the overall efficiency and processing times of the memory system 210 may increase.

Figure 3:
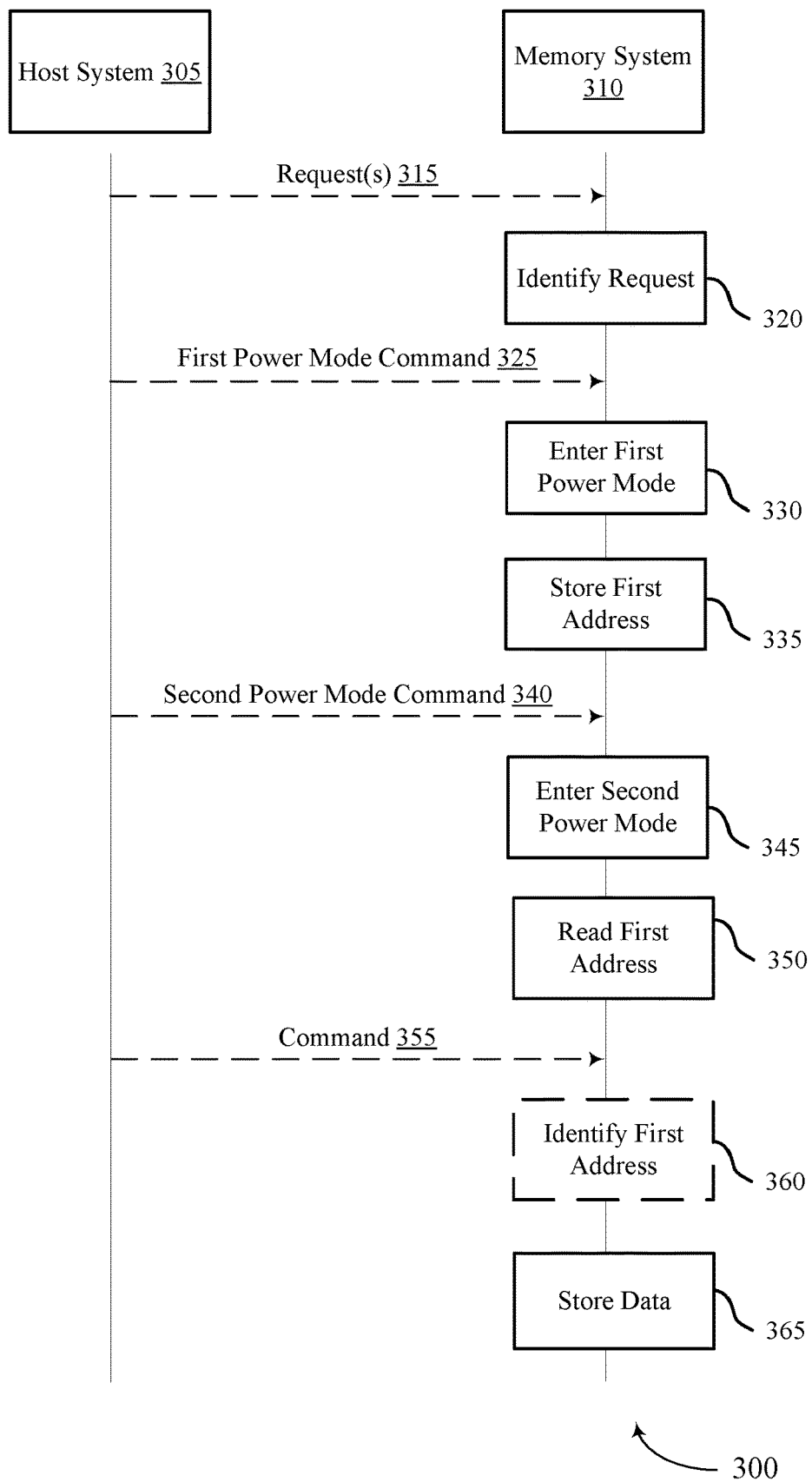
FIG. 3 illustrates an example of a process flow that supports memory systems for secure sequential storage devices in accordance with examples as disclosed herein.

FIG. 3 illustrates an example of a process flow 300 that supports memory systems for secure sequential storage devices in accordance with examples as disclosed herein. The process flow 300 may include a host system 305 and a memory system 310. The host system 305 and the memory system 310 may be examples of the corresponding devices described with respect to FIGS. 1 and 2. Alternative examples of the following may be implemented, where some steps are performed in a different order than described or not performed. In some cases, steps may include additional features not mentioned below, or further steps may be added.

At 315, the host system 305 may send a request, and the memory system 310 may receive the request. The request may be an example of a request for a first portion of a memory system to operate in a first configuration and a second portion of the memory system to operate in a second configuration different from the first configuration. For example, the memory system 310 may receive the request for the first portion to operate in the first configuration (e.g., black box configuration) and the second portion to operate in the second configuration (e.g., NAND configuration). In some cases, the request may be an example of a second request to initialize the memory system 310 including the first portion and the second portion. In such cases, the host system 305 may transmit the request, the memory system 310 may receive the request to initialize the memory system 310.

At 320, the memory system 310 may identify the request. For example, the memory system 310 may identify the request for the first portion of the memory system 310 to operate in the first configuration and the second portion of the memory system 310 to operate in the second configuration. In such cases, the memory system 310 may be configured to operate in the black box configuration and the NAND configuration. The identified request may determine whether the memory system 310 operates in a black box configuration, a NAND configuration, or both. In some cases, the memory system 310 may initialize a power cycle. In such cases, identifying the request may be based on receiving the request to initialize the memory system 310 including the first portion and the second portion.

At 325, the host system 305 may transmit a first power mode command. In such cases, the memory system 310 may receive a first command to enter a first power mode in response to identifying the request. The first power mode may be an example of a low power mode, a power off mode, a hibernate mode, or a combination thereof. For example, the memory system 310 may receive a command to enter a low power mode. In some examples, the memory system 310 may determine that a power loss event occurred in response to receiving the request, the command, or both. For example, the memory system 310 may detect a power loss event. The power loss event may be scheduled or random.

At 330, the memory system 310 may enter the first power mode. The first power mode may have a lower power consumption than a second power mode. The second power mode may be an example of a power on mode, an active mode, or both. In some cases, the first portion of the memory system 310 may enter the first power mode. The memory system 310 may enter the first power mode based on receiving the request, receiving the first command, determining that the power loss event occurred, or a combination thereof.

At 335, the memory system 310 may store a first address. The first address may be associated with a last information to be stored in the first portion of the memory system 310 before the first portion entered the first power mode. A last successfully written LBA may be an example of the last information to be stored in the first portion of the memory system 310 before the first portion entered the first power mode. In some cases, the first address may be stored in a register associated with the first portion of the memory system 310. For example, the memory system 310 may store a value in a register that indicates the last successfully written LBA in the region when a power loss event occurred.

At 340, the memory system 310 may receive a second power mode command. For example, the memory system 310 may receive a command to enter the second power mode based on storing the first address. In such cases, the memory system 310 may receive a command to power on. At 345, the memory system 310 may enter the second power mode. For example, the memory system 310 may enter the second power mode in response to receiving the second power mode command and/or storing the first address in the register. In some cases, the first portion of the memory system 310 may enter the second power mode.

At 350, the memory system 310 may read the first address. For example, the memory system 310 may read the first address in direct response to entering the second power mode. In some cases, the memory system 310 may read the first address from the register associated with the first portion. In such cases, the memory system 310 may read the register to determine the last successfully written LBA. For example, the memory system 310 may determine that the first address was written to before the first portion entered the first power mode. In some examples, the memory system 310 may determine the last successfully written LBA when the power loss event occurred. The memory system 310 may identify a second address that is consecutively indexed after the first address. In such cases, the memory system 310 may determine the next LBA after last successfully written LBA.

At 355, the memory system 310 may receive a command to store data in the first portion of the memory system. The command may fail to include a logical address associated with the data. In contrast, a write command for the second portion of the memory system 310 that operates according to a NAND configuration may include a logical address associated with the information. In such cases, the write commands for the first portion of the memory system 310 and the second portion of the memory system 310 may include different information. At 360, the memory system 310 may identify the first address. For example, the memory system 310 may identify the first address for the data using one or more pointers maintained for the first portion of the memory system 310 operating according to the first configuration. The first address may be identified in direct response to receiving the command.

At 365, the memory system 310 may store data. For example, the memory system 310 may store data in a second address consecutively indexed after the first address based on reading the first address. In such cases, the memory system 310 may write to the next LBA after the last successfully written LBA. The memory system 310 may store the data in the second address based on determining that the first address was last written to before the first portion entered the first power mode. In some cases, the memory system 310 may store the data in the first portion based on identifying the first address, receiving the command that fails to include the logical address, identifying the second address, or a combination thereof.

Figure 4:
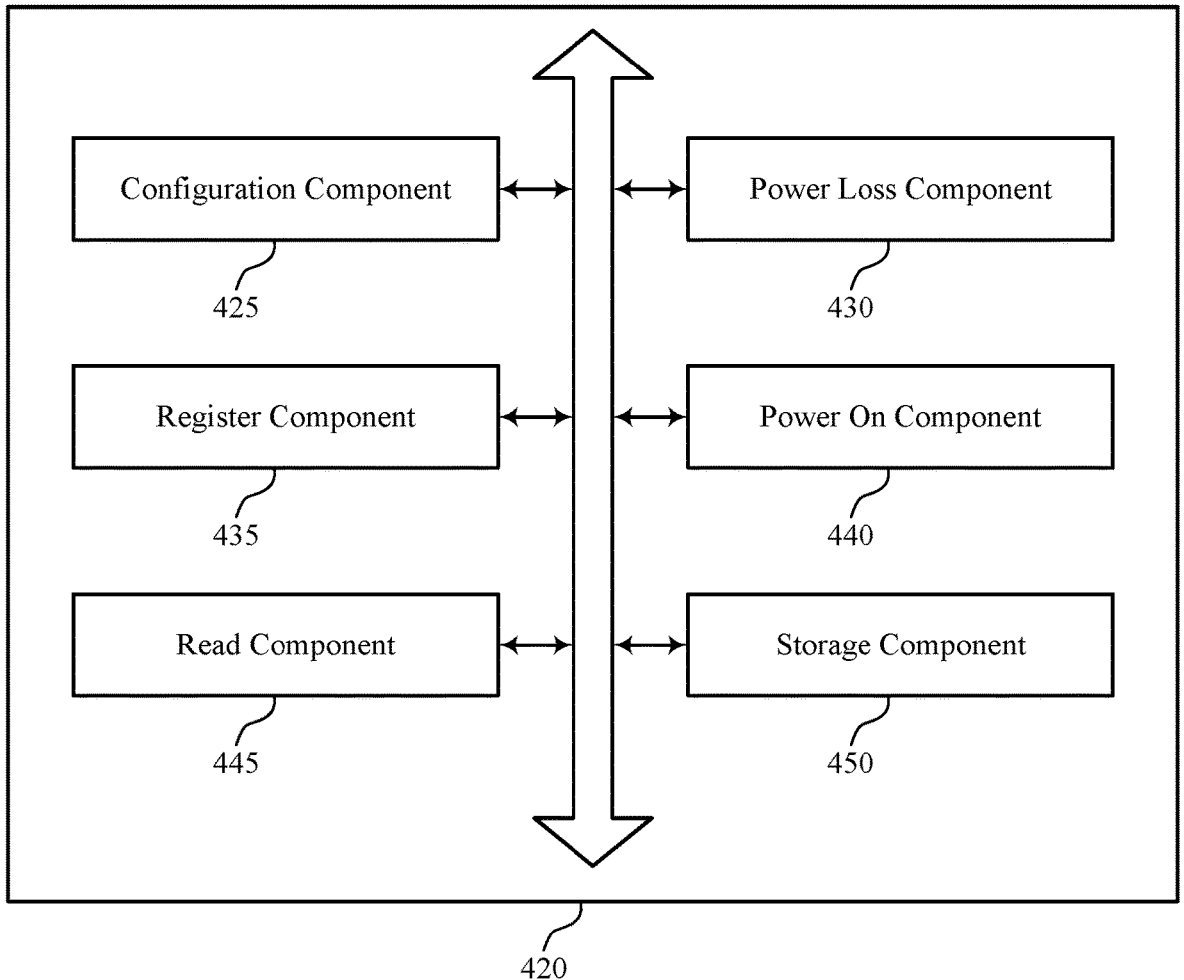
FIG. 4 shows a block diagram of a memory system that supports memory systems for secure sequential storage devices in accordance with examples as disclosed herein.

FIG. 4 shows a block diagram 400 of a memory system 420 that supports memory systems for secure sequential storage devices in accordance with examples as disclosed herein. The memory system 420 may be an example of aspects of a memory system as described with reference to FIGS. 1 through 3. The memory system 420, or various components thereof, may be an example of means for performing various aspects of memory systems for secure sequential storage devices as described herein. For example, the memory system 420 may include a configuration component 425, a power loss component 430, a register component 435, a power on component 440, a read component 445, a storage component 450, or any combination thereof. Each of these components may communicate, directly or indirectly, with one another (e.g., via one or more buses).

The configuration component 425 may be configured as or otherwise support a means for identifying a request for a first portion of a memory system to operate in a first configuration and a second portion of the memory system to operate in a second configuration different from the first configuration. The power loss component 430 may be configured as or otherwise support a means for entering, by at least the first portion of the memory system, a first power mode having a lower power consumption than a second power mode based at least in part on receiving the request. The register component 435 may be configured as or otherwise support a means for storing a first address associated with a last information to be stored in the first portion of the memory system before the first portion entered the first power mode. The power on component 440 may be configured as or otherwise support a means for entering, by at least the first portion of the memory system, the second power mode based at least in part on storing the first address. The read component 445 may be configured as or otherwise support a means for reading the first address based at least in part on entering the second power mode. The storage component 450 may be configured as or otherwise support a means for storing data in a second address consecutively indexed after the first address based at least in part on reading the first address.

In some examples, the read component 445 may be configured as or otherwise support a means for determining that the first address was written to before the first portion entered the first power mode based at least in part on reading the first address, where storing the data in the second address is based at least in part on determining that the first address was last written to before the first portion entered the first power mode.

In some examples, the read component 445 may be configured as or otherwise support a means for identifying that the second address is consecutively indexed after the first address based at least in part on reading the first address, where storing the data in the second address is based at least in part on identifying the second address.

In some examples, the first portion of the memory system that operates according to the first configuration uses one or more pointers to write and overwrite information stored in the first portion. In some examples, the second portion of the memory system that operates according to the second configuration uses a mapping between logical addresses and physical addresses to manage information stored in the second portion.

In some examples, the power loss component 430 may be configured as or otherwise support a means for determining that a power loss event occurred based at least in part on receiving the request, where entering the first power mode is based at least in part on determining that the power loss event occurred.

In some examples, the configuration component 425 may be configured as or otherwise support a means for receiving a second request to initialize the memory system including the first portion and the second portion, where identifying the request is based at least in part on receiving the request.

In some examples, the configuration component 425 may be configured as or otherwise support a means for receiving the request for the first portion to operate in the first configuration and the second portion to operate in the second configuration, where identifying the request is based at least in part on receiving the request.

In some examples, the power loss component 430 may be configured as or otherwise support a means for receiving a first command to enter the first power mode based at least in part on identifying the request, where entering the first power mode is based at least in part on receiving the first command.

In some examples, the power on component 440 may be configured as or otherwise support a means for receiving a second command to enter the second power mode based at least in part on storing the first address, where reading the first address is based at least in part on receiving the second command.

In some examples, the storage component 450 may be configured as or otherwise support a means for receiving a command to store the data in the first portion of the memory system, the command failing to include a logical address associated with the data, where storing the data in the first portion is based at least in part on receiving the command that fails to include the logical address.

In some examples, the configuration component 425 may be configured as or otherwise support a means for identifying the first address for the data using one or more pointers maintained for the first portion of the memory system operating according to the first configuration based at least in part on receiving the command, where storing the data in the first portion is based at least in part on identifying the first address.

In some examples, the first address is stored in a register associated with the first portion of the memory system.

Figure 5:
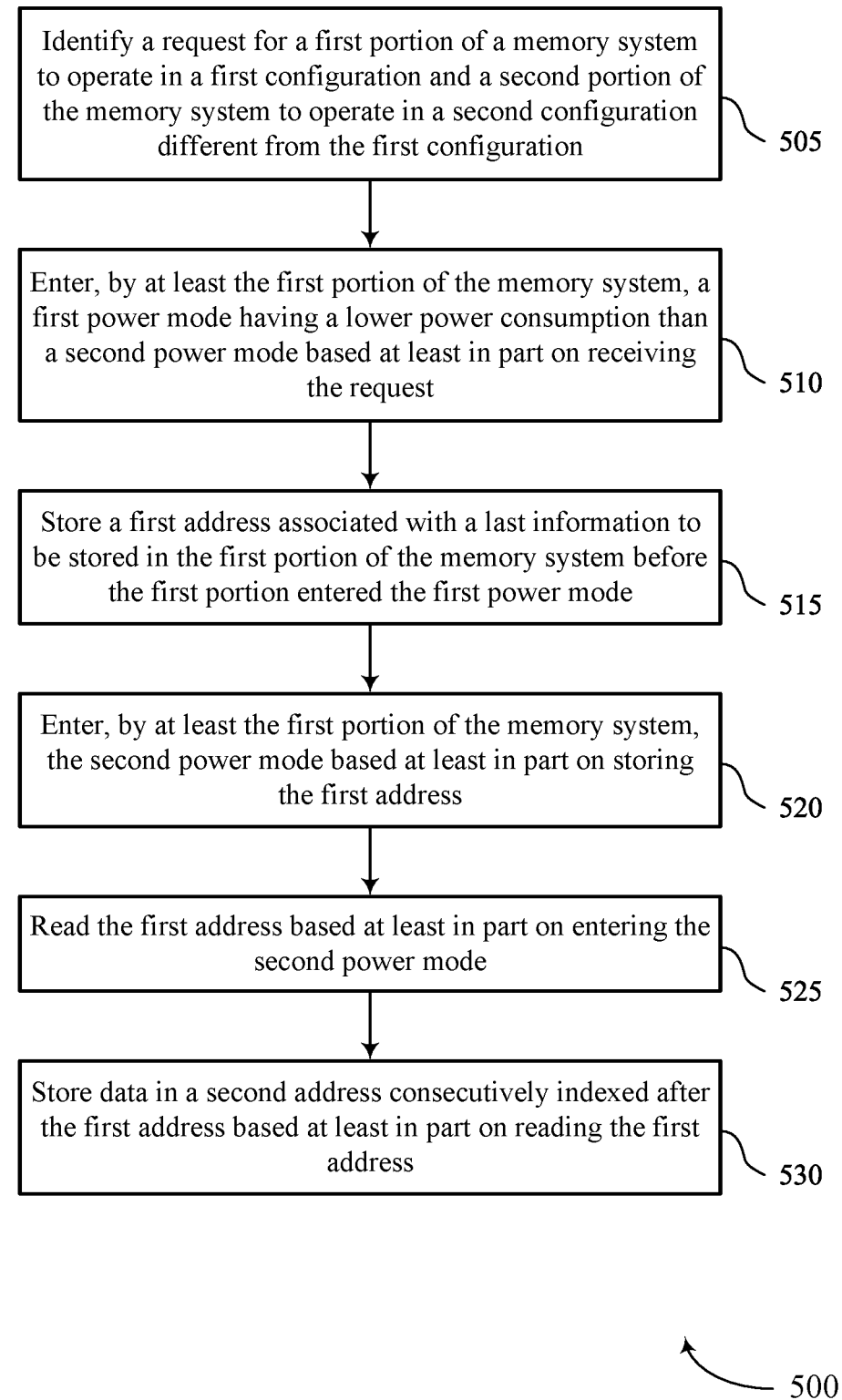
FIG. 5 shows a flowchart illustrating a method or methods that support memory systems for secure sequential storage devices in accordance with examples as disclosed herein.

FIG. 5 shows a flowchart illustrating a method 500 that supports memory systems for secure sequential storage devices in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include identifying a request for a first portion of a memory system to operate in a first configuration and a second portion of the memory system to operate in a second configuration different from the first configuration. The operations of 505 may be performed in accordance with examples as disclosed herein. In some examples, aspects of the operations of 505 may be performed by a configuration component 425 as described with reference to FIG. 4.

At 510, the method may include entering, by at least the first portion of the memory system, a first power mode having a lower power consumption than a second power mode based at least in part on receiving the request. The operations of 510 may be performed in accordance with examples as disclosed herein. In some examples, aspects of the operations of 510 may be performed by a power loss component 430 as described with reference to FIG. 4.

At 515, the method may include storing a first address associated with a last information to be stored in the first portion of the memory system before the first portion entered the first power mode. The operations of 515 may be performed in accordance with examples as disclosed herein. In some examples, aspects of the operations of 515 may be performed by a register component 435 as described with reference to FIG. 4.

At 520, the method may include entering, by at least the first portion of the memory system, the second power mode based at least in part on storing the first address. The operations of 520 may be performed in accordance with examples as disclosed herein. In some examples, aspects of the operations of 520 may be performed by a power on component 440 as described with reference to FIG. 4.

At 525, the method may include reading the first address based at least in part on entering the second power mode. The operations of 525 may be performed in accordance with examples as disclosed herein. In some examples, aspects of the operations of 525 may be performed by a read component 445 as described with reference to FIG. 4.

At 530, the method may include storing data in a second address consecutively indexed after the first address based at least in part on reading the first address. The operations of 530 may be performed in accordance with examples as disclosed herein. In some examples, aspects of the operations of 530 may be performed by a storage component 450 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor), or any combination thereof for performing the following aspects of the present disclosure:

Aspect 1: The method or apparatus, including operations, features, circuitry, logic, means, or instructions, or any combination thereof for identifying a request for a first portion of a memory system to operate in a first configuration and a second portion of the memory system to operate in a second configuration different from the first configuration; entering, by at least the first portion of the memory system, a first power mode having a lower power consumption than a second power mode based at least in part on receiving the request; storing a first address associated with a last information to be stored in the first portion of the memory system before the first portion entered the first power mode; entering, by at least the first portion of the memory system, the second power mode based at least in part on storing the first address; reading the first address based at least in part on entering the second power mode; and storing data in a second address consecutively indexed after the first address based at least in part on reading the first address.

Aspect 2: The method or apparatus of aspect 1, further including operations, features, circuitry, logic, means, or instructions, or any combination thereof for determining that the first address was written to before the first portion entered the first power mode based at least in part on reading the first address, where storing the data in the second address is based at least in part on determining that the first address was last written to before the first portion entered the first power mode.

Aspect 3: The method or apparatus of any of aspects 1 through 2, further including operations, features, circuitry, logic, means, or instructions, or any combination thereof for identifying that the second address is consecutively indexed after the first address based at least in part on reading the first address, where storing the data in the second address is based at least in part on identifying the second address.

Aspect 4: The method or apparatus of any of aspects 1 through 3, further including operations, features, circuitry, logic, means, or instructions, or any combination thereof for the first portion of the memory system that operates according to the first configuration uses one or more pointers to write and overwrite information stored in the first portion and the second portion of the memory system that operates according to the second configuration uses a mapping between logical addresses and physical addresses to manage information stored in the second portion.

Aspect 5: The method or apparatus of any of aspects 1 through 4, further including operations, features, circuitry, logic, means, or instructions, or any combination thereof for determining that a power loss event occurred based at least in part on receiving the request, where entering the first power mode is based at least in part on determining that the power loss event occurred.

Aspect 6: The method or apparatus of any of aspects 1 through 5, further including operations, features, circuitry, logic, means, or instructions, or any combination thereof for receiving a second request to initialize the memory system including the first portion and the second portion, where identifying the request is based at least in part on receiving the request.

Aspect 7: The method or apparatus of any of aspects 1 through 6, further including operations, features, circuitry, logic, means, or instructions, or any combination thereof for receiving the request for the first portion to operate in the first configuration and the second portion to operate in the second configuration, where identifying the request is based at least in part on receiving the request.

Aspect 8: The method or apparatus of any of aspects 1 through 7, further including operations, features, circuitry, logic, means, or instructions, or any combination thereof for receiving a first command to enter the first power mode based at least in part on identifying the request, where entering the first power mode is based at least in part on receiving the first command.

Aspect 9: The method or apparatus of any of aspects 1 through 8, further including operations, features, circuitry, logic, means, or instructions, or any combination thereof for receiving a second command to enter the second power mode based at least in part on storing the first address, where reading the first address is based at least in part on receiving the second command.

Aspect 10: The method or apparatus of any of aspects 1 through 9, further including operations, features, circuitry, logic, means, or instructions, or any combination thereof for receiving a command to store the data in the first portion of the memory system, the command failing to include a logical address associated with the data, where storing the data in the first portion is based at least in part on receiving the command that fails to include the logical address.

Aspect 11: The method or apparatus of aspect 10, further including operations, features, circuitry, logic, means, or instructions, or any combination thereof for identifying the first address for the data using one or more pointers maintained for the first portion of the memory system operating according to the first configuration based at least in part on receiving the command, where storing the data in the first portion is based at least in part on identifying the first address.

Aspect 12: The method or apparatus of any of aspects 1 through 11, further including operations, features, circuitry, logic, means, or instructions, or any combination thereof for the first address is stored in a register associated with the first portion of the memory system.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    identifying a request for a first portion of a memory system to operate in a first configuration and a second portion of the memory system to operate in a second configuration different from the first configuration;
    entering, by at least the first portion of the memory system, a first power mode having a lower power consumption than a second power mode based at least in part on receiving the request;
    storing a first address associated with a last information to be stored in the first portion of the memory system before the first portion entered the first power mode;
    entering, by at least the first portion of the memory system, the second power mode based at least in part on storing the first address;
    reading the first address based at least in part on entering the second power mode; and
    storing data in a second address consecutively indexed after the first address based at least in part on reading the first address.

2. The method of claim 1, further comprising:
    determining that the first address was written to before the first portion entered the first power mode based at least in part on reading the first address, wherein storing the data in the second address is based at least in part on determining that the first address was last written to before the first portion entered the first power mode.

3. The method of claim 1, further comprising:
    identifying that the second address is consecutively indexed after the first address based at least in part on reading the first address, wherein storing the data in the second address is based at least in part on identifying the second address.

4. The method of claim 1, wherein:
    the first portion of the memory system that operates according to the first configuration uses one or more pointers to write and overwrite information stored in the first portion; and
    the second portion of the memory system that operates according to the second configuration uses a mapping between logical addresses and physical addresses to manage information stored in the second portion.

5. The method of claim 1, further comprising:
    determining that a power loss event occurred based at least in part on receiving the request, wherein entering the first power mode is based at least in part on determining that the power loss event occurred.

6. The method of claim 1, further comprising:
    receiving a second request to initialize the memory system comprising the first portion and the second portion, wherein identifying the request is based at least in part on receiving the request.

7. The method of claim 1, further comprising:
    receiving the request for the first portion to operate in the first configuration and the second portion to operate in the second configuration, wherein identifying the request is based at least in part on receiving the request.

8. The method of claim 1, further comprising:
    receiving a first command to enter the first power mode based at least in part on identifying the request, wherein entering the first power mode is based at least in part on receiving the first command.

9. The method of claim 1, further comprising:
    receiving a second command to enter the second power mode based at least in part on storing the first address, wherein reading the first address is based at least in part on receiving the second command.

10. The method of claim 1, further comprising:
    receiving a command to store the data in the first portion of the memory system, the command failing to include a logical address associated with the data, wherein storing the data in the first portion is based at least in part on receiving the command that fails to include the logical address.

11. The method of claim 10, further comprising:
    identifying the first address for the data using one or more pointers maintained for the first portion of the memory system operating according to the first configuration based at least in part on receiving the command, wherein storing the data in the first portion is based at least in part on identifying the first address.

12. The method of claim 1, wherein the first address is stored in a register associated with the first portion of the memory system.

13. An apparatus, comprising:
    a processor;
    memory coupled with the processor; and
    instructions stored in the memory and executable by the processor to cause the apparatus to:
        identify a request for a first portion of a memory system to operate in a first configuration and a second portion of the memory system to operate in a second configuration different from the first configuration;
        enter, by at least the first portion of the memory system, a first power mode having a lower power consumption than a second power mode based at least in part on receiving the request;
        store a first address associated with a last information to be stored in the first portion of the memory system before the first portion entered the first power mode;
        enter, by at least the first portion of the memory system, the second power mode based at least in part on storing the first address;
        read the first address based at least in part on entering the second power mode; and
        store data in a second address consecutively indexed after the first address based at least in part on reading the first address.

14. The apparatus of claim 13, wherein the instructions are further executable by the processor to cause the apparatus to:
    determine that the first address was written to before the first portion entered the first power mode based at least in part on reading the first address, wherein storing the data in the second address is based at least in part on determining that the first address was last written to before the first portion entered the first power mode.

15. The apparatus of claim 13, wherein the instructions are further executable by the processor to cause the apparatus to:
    identify that the second address is consecutively indexed after the first address based at least in part on reading the first address, wherein storing the data in the second address is based at least in part on identifying the second address.

16. The apparatus of claim 13, wherein:
    the first portion of the memory system that operates according to the first configuration uses one or more pointers to write and overwrite information stored in the first portion; and
    the second portion of the memory system that operates according to the second configuration uses a mapping between logical addresses and physical addresses to manage information stored in the second portion.

17. The apparatus of claim 13, wherein the instructions are further executable by the processor to cause the apparatus to:
determine that a power loss event occurred based at least in part on receiving the request, wherein entering the first power mode is based at least in part on determining that the power loss event occurred.

18. The apparatus of claim 13, wherein the instructions are further executable by the processor to cause the apparatus to:
receive a second request to initialize the memory system comprising the first portion and the second portion, wherein identifying the request is based at least in part on receiving the request.

19. The apparatus of claim 13, wherein the instructions are further executable by the processor to cause the apparatus to:
receive the request for the first portion to operate in the first configuration and the second portion to operate in the second configuration, wherein identifying the request is based at least in part on receiving the request.

20. The apparatus of claim 13, wherein the instructions are further executable by the processor to cause the apparatus to:
receive a first command to enter the first power mode based at least in part on identifying the request, wherein entering the first power mode is based at least in part on receiving the first command.

21. The apparatus of claim 13, wherein the instructions are further executable by the processor to cause the apparatus to:
receive a second command to enter the second power mode based at least in part on storing the first address, wherein reading the first address is based at least in part on receiving the second command.

22. The apparatus of claim 13, wherein the instructions are further executable by the processor to cause the apparatus to:
receive a command to store the data in the first portion of the memory system, the command failing to include a logical address associated with the data, wherein storing the data in the first portion is based at least in part on receiving the command that fails to include the logical address.

23. The apparatus of claim 22, wherein the instructions are further executable by the processor to cause the apparatus to:
identify the first address for the data using one or more pointers maintained for the first portion of the memory system operating according to the first configuration based at least in part on receiving the command, wherein storing the data in the first portion is based at least in part on identifying the first address.

24. The apparatus of claim 13, wherein the first address is stored in a register associated with the first portion of the memory system.

25. A non-transitory computer-readable medium storing code, the code comprising instructions executable by a processor to:
identify a request for a first portion of a memory system to operate in a first configuration and a second portion of the memory system to operate in a second configuration different from the first configuration;
enter, by at least the first portion of the memory system, a first power mode having a lower power consumption than a second power mode based at least in part on receiving the request;
store a first address associated with a last information to be stored in the first portion of the memory system before the first portion entered the first power mode;
enter, by at least the first portion of the memory system, the second power mode based at least in part on storing the first address;
read the first address based at least in part on entering the second power mode; and
store data in a second address consecutively indexed after the first address based at least in part on reading the first address.

* * * * *